US005112069A

United States Patent [19]

Aldus et al.

[11] Patent Number: 5,112,069

[45] Date of Patent: May 12, 1992

[54] TRAVEL-AIR CHAIR

[76] Inventors: Richard E. Aldus; Anita L. Aldus, both of 407 Valletta Ct., Punta Gorda, Fla. 33950

[21] Appl. No.: 760,094

[22] Filed: Sep. 16, 1991

[51] Int. Cl.[5] .................... B62B 3/02

[52] U.S. Cl. .................... 280/42; 280/647; 280/650; 280/657; 297/42; 297/45

[58] Field of Search .................... 280/250.1, 647, 42, 280/649, 650, 657; 297/DIG. 4, 42, 45, 51, 107

[56] References Cited

U.S. PATENT DOCUMENTS

| | | | |
|---|---|---|---|
| 2,095,411 | 10/1937 | Everest et al. | 280/650 |
| 4,025,088 | 5/1977 | Rothschild | 280/649 |
| 4,229,039 | 10/1980 | Day | 280/650 |
| 4,415,177 | 11/1983 | Hale et al. | 280/650 |
| 4,639,012 | 1/1987 | Jensen | 280/650 |
| 4,728,119 | 3/1988 | Sigafoo | 280/250.1 |
| 4,826,196 | 5/1989 | Kirkpatrick et al. | 280/650 |
| 4,861,056 | 8/1989 | Duffy, Jr. et al. | 280/250.1 |

*Primary Examiner*—Andres Kashnikow
*Assistant Examiner*—Eric Culbreth
*Attorney, Agent, or Firm*—Frank A. Lukasik

[57] ABSTRACT

The invention is an improved wheel chair made essentially of metal or plastic pipe, and is capable of being folded into a compact size which may be conveniently stored in the hanging wardrobe or overhead storage of an aircraft. The chair comprises a removable cane handle supported back rest, removable foot rest and rear extension bar and a fabric seat looped over and fastened to and between a pair of seat bars affixed to a pair of intersecting braces connected together by a longitudinal bolt. The intersecting braces each have a sleeve affixed at the bottom end which fits on and rotate on pivot member affixed to the bottom of the side frames.

3 Claims, 4 Drawing Sheets

TRAVEL-AIR CHAIR

BACKGROUND OF THE INVENTION

1. Field of the Invention

This invention relates generally to a wheel chair for a disabled person and more particularly to a lightweight, uniquely foldable wheel chair for stowage in areas of limited space and for transportation of disabled persons throughout the interiors of aircraft, trains, buses, ships and other vehicles.

2. Discussion of the Prior Art

Current and prior art wheel chair designs available are singular in purpose and primarily allow movement of an individual from place to place. The mobility of disabled persons has been increasing in recent years to include not only social and business life, but travel as well. Where once a disabled individual was expected to restrict travel away from home, today these special people are traveling around the world to conduct business or to vacation. Generally, this need for travel mobility felt by the disabled has been frustrated due to the lack of proper facilities and equipment aboard transportation vehicles. In a recent incident, two high-level Government Officials were refused access to an aircraft because both were in wheelchairs. Advocates for the disabled insist that such incidents are a frequent occurrence because Federal Regulations allow it.

Over the years, seat cost per mile has become paramount in the financial success of transportation companies and has increasingly dictated the size and shape of passenger vehicle interiors. Hence, narrow aisles, small lavatories, small stowage areas, and restricted use of transportation vehicle facilities have limited travel by the disabled communities. Stowage space required to store items such as foldable wheel chairs is also at a premium. Ideally, such folding wheelchairs should be lightweight, should be of a size readily operable within narrow aisles, should be easy to fold and unfold in limited space working areas, and should fold into as narrow and compact a unit as possible.

Several designs for folding wheelchairs have been offered for use by the disabled which generally suffer from on or more disadvantages vis-a-vis transportation vehicle use. One example of such a device is U.S. Pat. No. 2,095,411 to Everest et al which discloses a folding wheel chair of a type in which the leg framework carrying the wheels may be collapsed or folded inwardly. The seat is formed of fabric looped between the vertically sliding members, such seat folding when the two side legs are shifted together as does the foot rest or step which is connected to the front to rear bottom member. A fabric back may also be extended or folded U.S. Pat. No. 4,025,088 to Rothschild discloses a folding wheel chair which has the ability to collapse in the fore and aft directions and laterally. The chair back and arm rests are also foldable to minimize the height of the collapsed chair which is then highly compact. When the chair is unfolded for use, pairs of pivot elements on the on the foldable leg members of the chair form stops for the arm rests and chair back.

U.S. Pat. No. 4,229,039 to Day discloses an insert travel chair which includes a back, pivotable both forwardly and rearwardly and pivotable underneath the chair to form a generally triangular arrangement for ease in carrying and also includes detachable wheels for use in automobiles. U.S. Pat. No. 4,415,177 to Hale et al discloses a folding wheel chair wherein the wheel chair is folded via a spider mechanism comprising a body and four leg elements. The end portions of the leg elements are pivotally secured to the frame. Folding and unfolding of the chair is carried out by use of a handle which rotates a set of cams.

U.S. Pat. No. 4,639,012 to Jensen discloses a wheelchair for transporting a physically handicapped person down the narrow aisle of a commercial passenger airplane. The wheel chair can be manipulated into a folded arrangement that can be stowed secured by a plurality of catches against a vertical wall in the passenger compartment of an aircraft. While still secured to the wall, a seat pan is pulled down against a seat return spring and is usable as a flight attendant's seat.

U.S. Pat. No. 4,826,196 to Kirkpatrick et al discloses a portable wheelchair having a metal wire frame is provided. The individual frame members are interconnected by clinched loop, hinged connections, and fold together in a manner that minimizes the space required for the stored configuration of the wheel chair. The metal wire fabrication also minimizes the wheel chair weight and the visual profile of the wheel chair in its deployed configuration.

All of the above prior art patents, whether directed to wheel chairs or other type carriers, utilize rather complex folding mechanisms which include a multiplicity of hinged and pivoted parts. They also have a tendency to be much heavier than otherwise be necessary, and in many cases, are folded into a package which is larger than might otherwise be desirable. In addition, the complexity and added weight add to the cost of manufacturing the wheel chair.

SUMMARY OF THE INVENTION

The invention is a wheel chair made essentially of metal or plastic pipe, and is capable of being folded into a compact size which may be conveniently stored in the hanging wardrobe or overhead storage of an aircraft. The chair comprises removable cane handles, footrest, nylon seat and back rest and strapping. The chair will pass through a 16" wide door when opened and folds to a compact size of approximately 25" high, 6" wide, and 22" long. It may be conveniently carried in a nylon or other fabric carrying bag.

In view of the need for enhanced mobility systems for the disabled, especially the desire for compact, inexpensive and non-complex wheel chairs for use by the disabled when using limited space transportation vehicles, there is a need for a folding wheel chair which satisfies all these requirements.

Accordingly, it is the principal object of the invention to provide a new and improved folding wheel chair which is lightweight and inexpensive to produce and which is particularly well adapted for use with transportation vehicles.

Another object of the invention is to provide a relatively non-complex folding wheel chair that can be easily and rapidly unfolded and folded and that is particularly well adapted to be put away in small stowage areas when in the folded condition.

A still further object of the invention is to provide a means onboard a commercial passenger airplane for the transportation of disabled persons to-and-from the airplane as well as throughout the interior aisles of the passenger compartment.

Yet another object of the invention is to provide a wheel chair that is narrow enough for maneuvering down the aisle so that a wheel chair bound person can leave his/her seat with the assistance of a caretaker, go into the restroom and transfer to the toilet.

These and other objects will become more clear upon a consideration of he following description of a preferred embodiment.

DESCRIPTION OF THE PREFERRED EMBODIMENT

Figure 1:
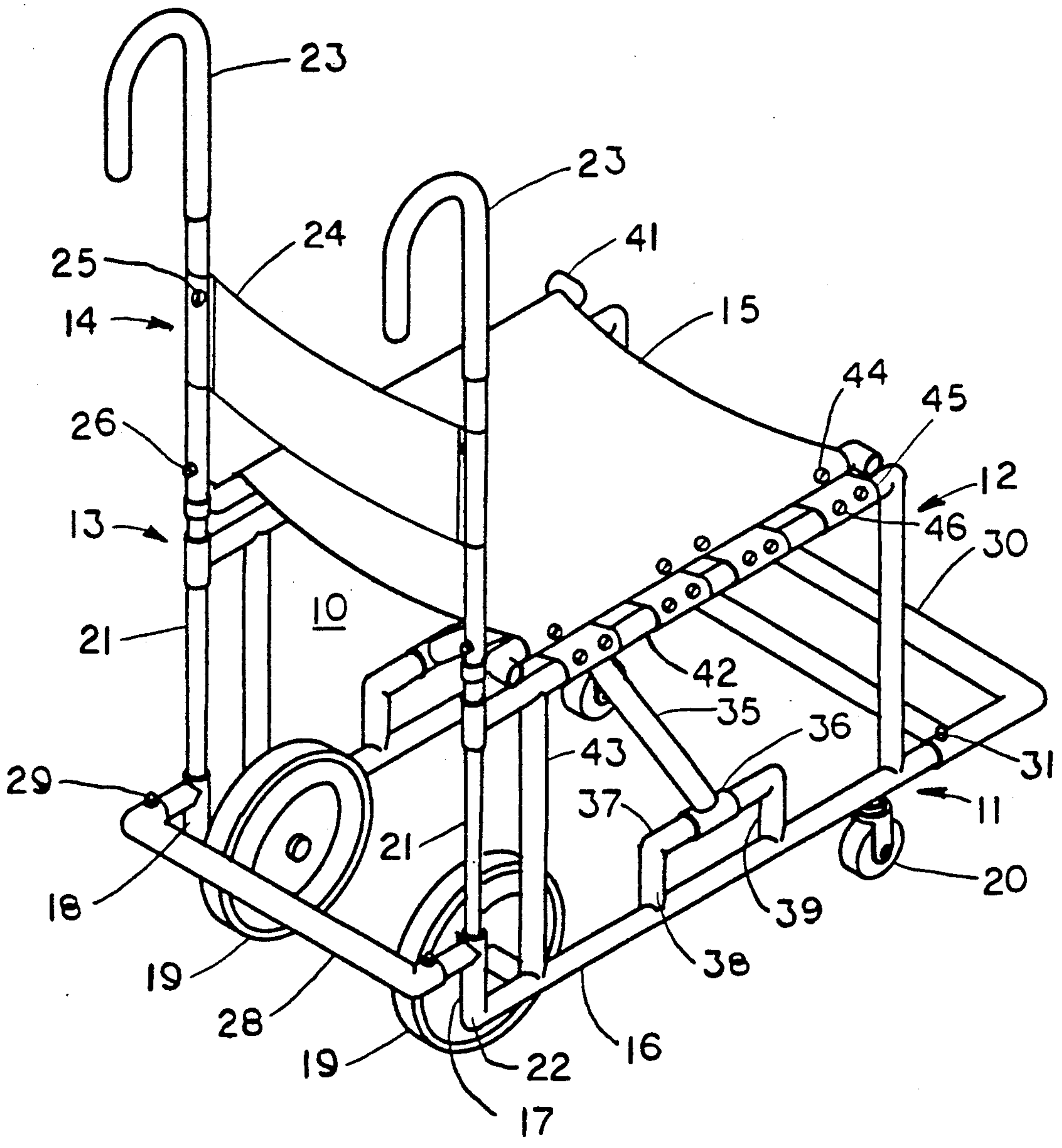
FIG. 1 is a perspective view of the travel-lift chair in accordance with the present invention.
Figure 2:
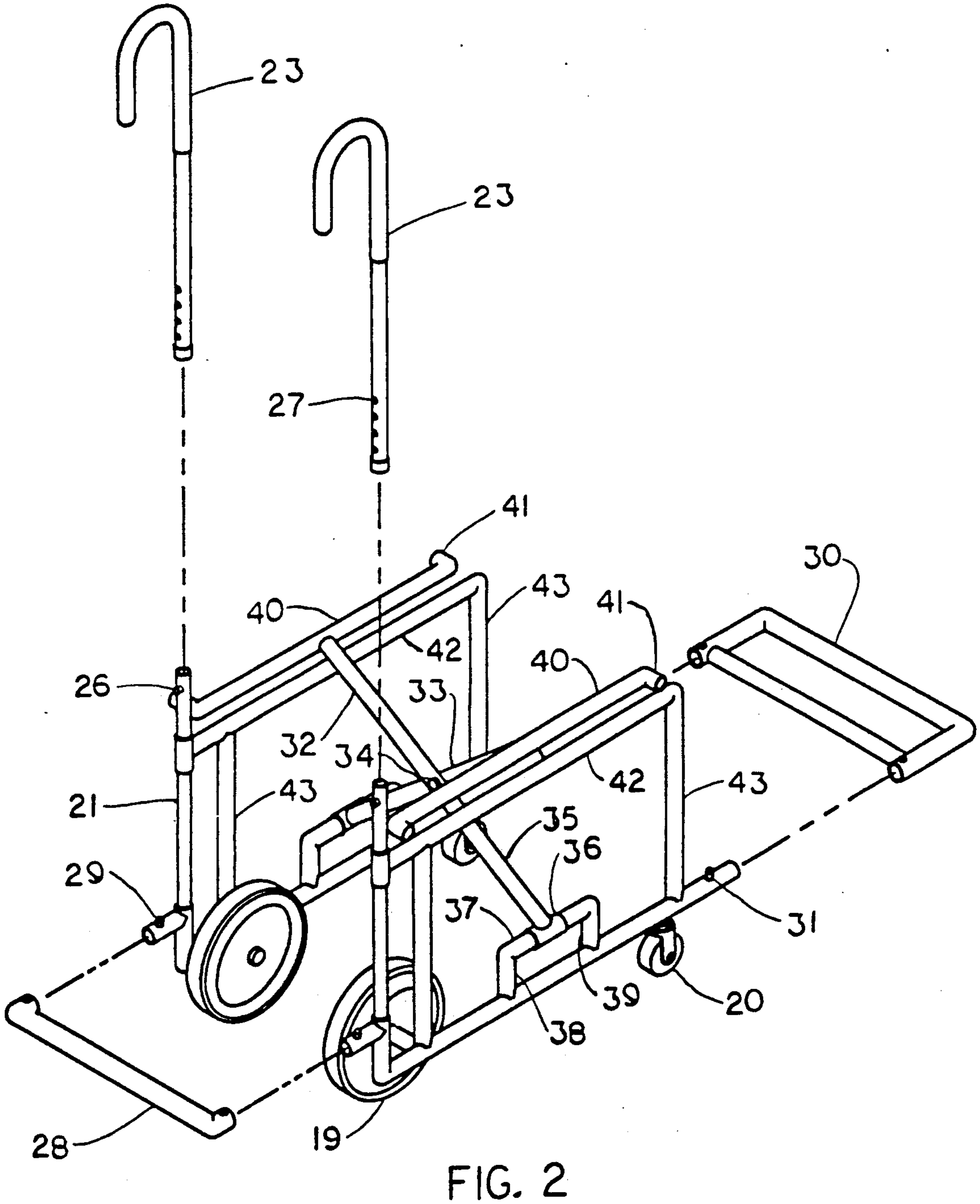
FIG. 2 is an exploded perspective view showing the removable parts for folding the travel-lift chair of the invention.
Figure 3:
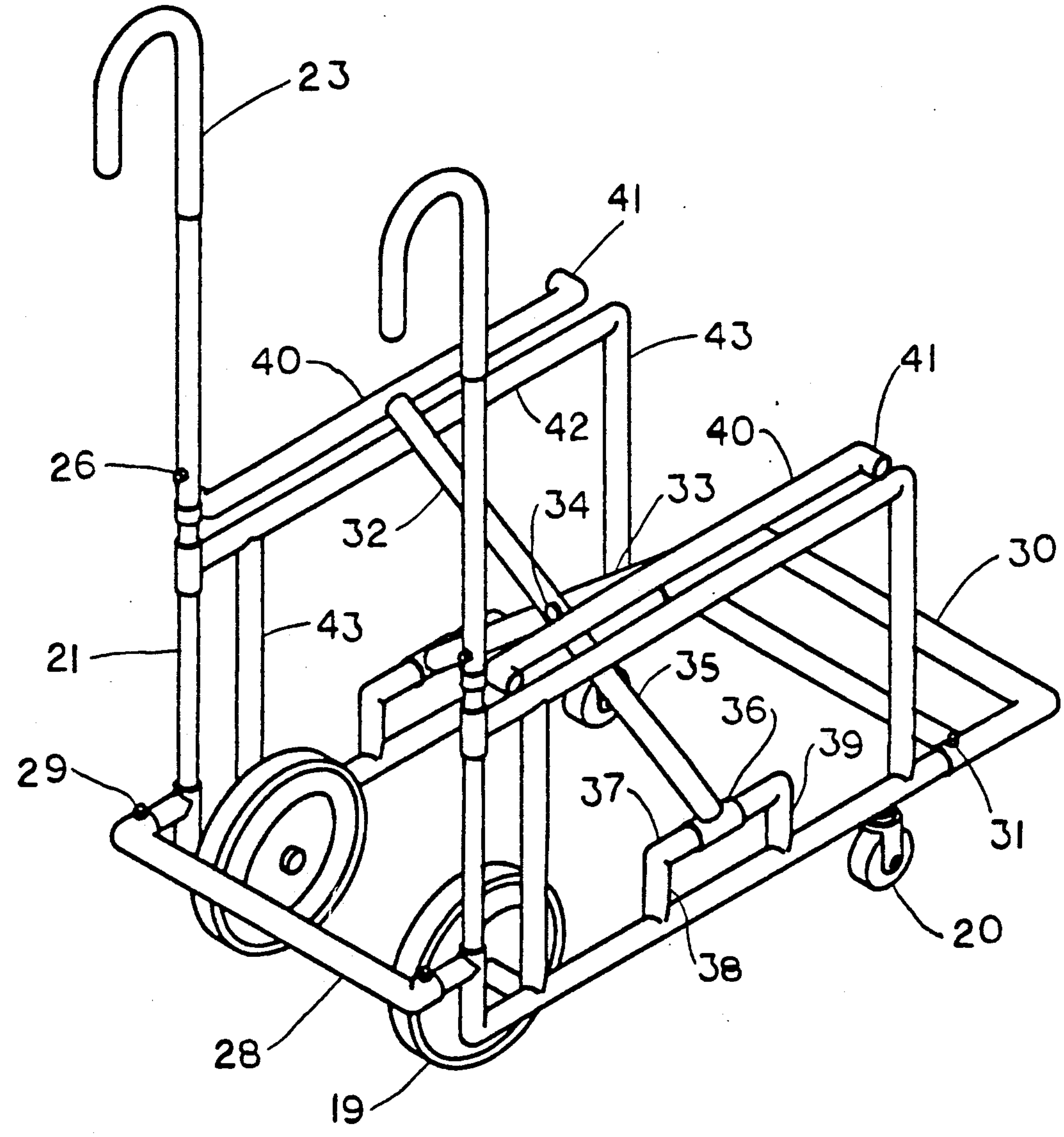
FIG. 3 is a perspective view of the travel-lift chair without the seat and back rest.

The wheel chair 10 of the present invention is shown in FIGS. 1-3 in its open position The wheel chair 10 comprises base 11, sides 12, back 13, removable seat back 14 and seat 15. The base 11 includes a lower frame 16 comprising tubes 17, 18, two fixed wheels 19 at the rear (the pushing end) and two swivel caster wheels 20 at the front end. The fixed wheels 19 are mounted inside the frame 16 to reduce the outer width of the chair 10. Rear chair posts 21 extend upwardly from tubes 17 and 18 at right angle bend 22 at the end of lower frame 16. In a preferred embodiment, rear chair posts 21 and cane handles 23 were made from two-piece, adjustable length walking canes manufactured by American Sunmark Co., San Francisco, Calif. 94104. A fabric seat back 24, stitched at each end to form a pocket, is slipped over cane handles 23 and fastened at each end with screws 25 and is stretched to a desired tension between the cane handles 23 when the chair is in its expanded position. When it is desired to remove the fabric seat back 24, the detents 26 are pressed and the cane handles 23 are removed. The height of the seat back 24 and cane handles 23 may be adjusted by pressing spring-loaded detents 26 and selecting the appropriate hole 27 for the desired height.

Extension 28 is provided at the rear lower frame 16 to hold the sides 12 apart in the expanded position and also to assist the caretaker in moving the chair over small obstacles by use of foot leverage. Extension 28 may be held in position by detents 29 or other convenient quick connect devices. Foot rest 30 is provided at the front lower frame 16 to hold the sides 12 apart and to provide foot support for the rider. The foot rest 30 may be held in position by detents 31 or other quick connect devices.

Referring now to FIG. 2, diagonal braces 32 and 33 are connected together by a longitudinal bolt 34. The intersecting braces 32 and 34 are preferably formed of tubes. The bottom of the lower portion 35 of each brace 32 and 34 is rigidly connected to a sleeve 36 being fitted over a tube 37 connecting the right angle tubes 38 and 39. The seat bars 40, attached at the upper ends of diagonal braces 32 and 34, each comprise two short end bars 41 each being adapted to rest on horizontal tube 42 of sides 12. Horizontal tube 42 is supported by vertical tubes 43 of sides 12. This construction permits the side frames 12 of the chair to be spread apart as shown in FIG. 1 or folded or collapsed as shown in FIG. 4.

The chair is provided with a fabric seat 15 which is looped over and fastened to seat bars 40. The fabric 15 of the seat, from the front to rear direction, extends substantially between the end bars 41. The bottom of the fabric 15 of the seat is secured by snaps or screws 44 or similar fasteners so that the fabric 15 may be readily removed from the chair for cleaning or replacement.

Figure 4:
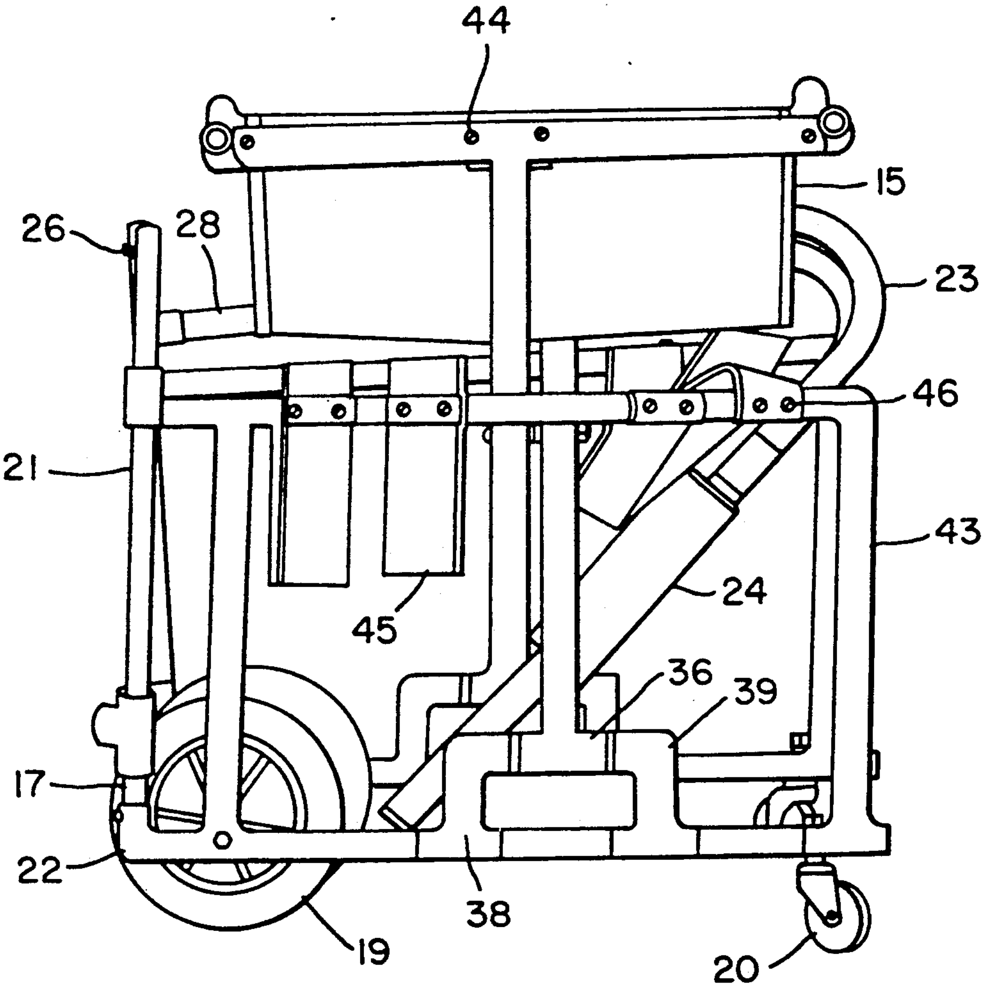
FIG. 4 is a side view of the travel-lift chair in a folded position.

Fabric or plastic strips 45 are suitably attached to horizontal tubes 42 as shown in FIGS. 2 and 4 by snaps or screws 46. Sides 12 are prevented from moving inwardly by diagonal braces 32 and 33 and are prevented from outward movement by strips 45 when in an open position. FIG. 4 shows strips 45 hanging loosely when the chair is in a folded position. In a preferred embodiment made of PVC pipe, the dimensions of the chair in a folded position was 22" long, 25" high, and 6" wide. The chair may be conveniently carried in a fabric or plastic carrying bag.

Although the system described in detail above has been found to be most satisfactory and preferred, many variations in mechanics, structure and method are possible. For example, steel, aluminum, or plastic may be used for the frame structure. The seat 15 may be canvas or plastic as well as the strips 45 used to hold the sides 12 in a separated position. Manual brakes may also be added to the fixed wheels 19 without increasing the size of the chair in a folded position.

The above are exemplary of the possible changes or variations because many varying and different embodiments made within the scope of the inventive concept herein taught and because many modifications may be made in the embodiments herein detailed in accordance with the descriptive requirements of law, it should be understood that the details herein are to be interpreted as illustrative and not in a limiting sense.

What is claimed is:

1. A narrow, light-weight folding wheel chair that can be easily and rapidly unfolded and folded comprising:

a pair of side frames including two lower horizontal tubes in parallel relationship to each other, said tubes having upwardly extending tubes at a first end, and forwardly extending tubes at a second end, pivot means affixed on each of said lower horizontal tubes between said first and second ends, a pair of vertical support means including vertical tubes affixed at a lower end to said horizontal tubes near said first and second ends, and a pair of horizontal seat bars, each affixed at a top end of each of said vertical tubes, an extension tube removably attached to each of said upwardly extending tubes for holding said side frames in spaced relationship, means removably attached to each of said forwardly extending tubes for providing a horizontal foot rest, a plurality of strap means looped over and affixed to and between each of said horizontal seat bars, a pair of fixed wheels and a pair of swivel wheels attached to said lower horizontal tubes, seat means having a pair of seat bars affixed to a pair of intersecting braces connected together by a longitudinal bolt, a bottom section of each brace having a sleeve affixed thereto, each of said sleeves being fitted over one of each of said pivot means and fabric means looped over and fastened to and between said seat bars, and seat back means removably attached to said side frames at said first end.

2. A narrow, light-weight folding wheel chair as described in claim 1 wherein said seat back means consists of two adjustable cane handles and a fabric seat back stitched at each end to form pockets, said pockets being slipped over and fastened to said cane handles and stretched to a desired tension between said cane handles when said chair is in its unfolded position.

3. A wheel-chair as described in claim 1 wherein said extension tube, said horizontal foot rest and said seat back means are held in place by detents.

* * * * *